US012742551B1

(12) United States Patent
Binek et al.

(10) Patent No.: US 12,742,551 B1
(45) Date of Patent: Sep. 22, 2026

(54) DOME COMBUSTOR WITH AIR BLAST

(71) Applicant: RTX Corporation, Farmington, CT (US)

(72) Inventors: Lawrence Binek, Glastonbury, CT (US); Frederick Rosenberger, Marlborough, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 19/247,653

(22) Filed: Jun. 24, 2025

(51) Int. Cl.
*F23R 3/32* (2006.01)
*F02C 7/22* (2006.01)
*F23R 3/16* (2006.01)
*F23R 3/28* (2006.01)
*F23R 3/50* (2006.01)

(52) U.S. Cl.
CPC ................ *F23R 3/32* (2013.01); *F02C 7/222* (2013.01); *F23R 3/16* (2013.01); *F23R 3/283* (2013.01); *F23R 3/286* (2013.01); *F23R 3/50* (2013.01)

(58) Field of Classification Search
CPC ........ F02C 7/222; F05D 2240/36; F23R 3/16; F23R 3/283; F23R 3/286; F23R 3/32; F23R 3/50
See application file for complete search history.

(56) References Cited

U.S. PATENT DOCUMENTS

| | | | | |
|---|---|---|---|---|
| 4,203,283 A * | 5/1980 | Weiler | F23R 3/50 | 60/39.511 |
| 5,220,794 A | 6/1993 | Sledd et al. | | |
| 5,277,022 A | 1/1994 | Shekleton et al. | | |
| 5,596,873 A * | 1/1997 | Joshi | F23R 3/286 | 60/738 |
| 5,653,109 A * | 8/1997 | Overton | F23R 3/283 | 60/746 |
| 6,295,801 B1 | 10/2001 | Burrus et al. | | |
| 6,983,606 B2 | 1/2006 | Brown | | |
| 2006/0042263 A1* | 3/2006 | Patel | F23R 3/12 | 60/776 |
| 2007/0119183 A1* | 5/2007 | Evulet | F23R 3/286 | 60/737 |
| 2009/0277176 A1* | 11/2009 | Caples | F02C 9/34 | 60/737 |
| 2018/0187892 A1* | 7/2018 | Patel | F23D 11/24 | |
| 2021/0156564 A1* | 5/2021 | Prociw | F23R 3/343 | |

* cited by examiner

*Primary Examiner* — Scott J Walthour
(74) *Attorney, Agent, or Firm* — Kinney & Lange, P.A.

(57) ABSTRACT

A combustor assembly for a gas turbine engine includes an annular combustor disposed about an axis and a fuel system. The combustor includes an inner wall, an outer wall, and a dome connecting the inner wall and outer wall to define an annular combustion chamber. The fuel system includes a fuel manifold disposed forward of the dome, a plurality of air blast injectors connected to the dome and circumferentially arranged about the axis, and a plurality of fuel injectors fluidly connected to the fuel manifold. Each of the plurality of air blast injectors includes an inlet disposed adjacent to the fuel manifold and an outlet disposed in the combustion chamber. Each of the plurality of fuel injectors is shrouded in an air blast injector of the plurality of air blast injectors.

18 Claims, 4 Drawing Sheets

DOME COMBUSTOR WITH AIR BLAST

BACKGROUND

The present disclosure is generally related to a combustor of a gas turbine engine and, more particularly, to a combustor fuel system.

Fuel systems consist of a large quantity of subcomponents that require assembly and integration into a combustor case and lining. A need exists for fuel system unitization that reduces the number of parts for assembly while enhancing overall fuel system and combustor performance.

SUMMARY

A combustor assembly for a gas turbine engine includes an annular combustor disposed about an axis and a fuel system. The combustor includes an inner wall, an outer wall, and a dome connecting the inner wall and outer wall to define an annular combustion chamber. The fuel system includes a fuel manifold disposed forward of the dome, a plurality of air blast injectors connected to the dome and circumferentially arranged about the axis, and a plurality of fuel injectors fluidly connected to the fuel manifold. Each of the plurality of air blast injectors includes an inlet disposed adjacent to the fuel manifold and an outlet disposed in the combustion chamber. Each of the plurality of fuel injectors is shrouded in an air blast injector of the plurality of air blast injectors.

The present summary is provided only by way of example, and not limitation. Other aspects of the present disclosure will be appreciated in view of the entirety of the present disclosure, including the entire text, claims and accompanying figures.

Figure 1:
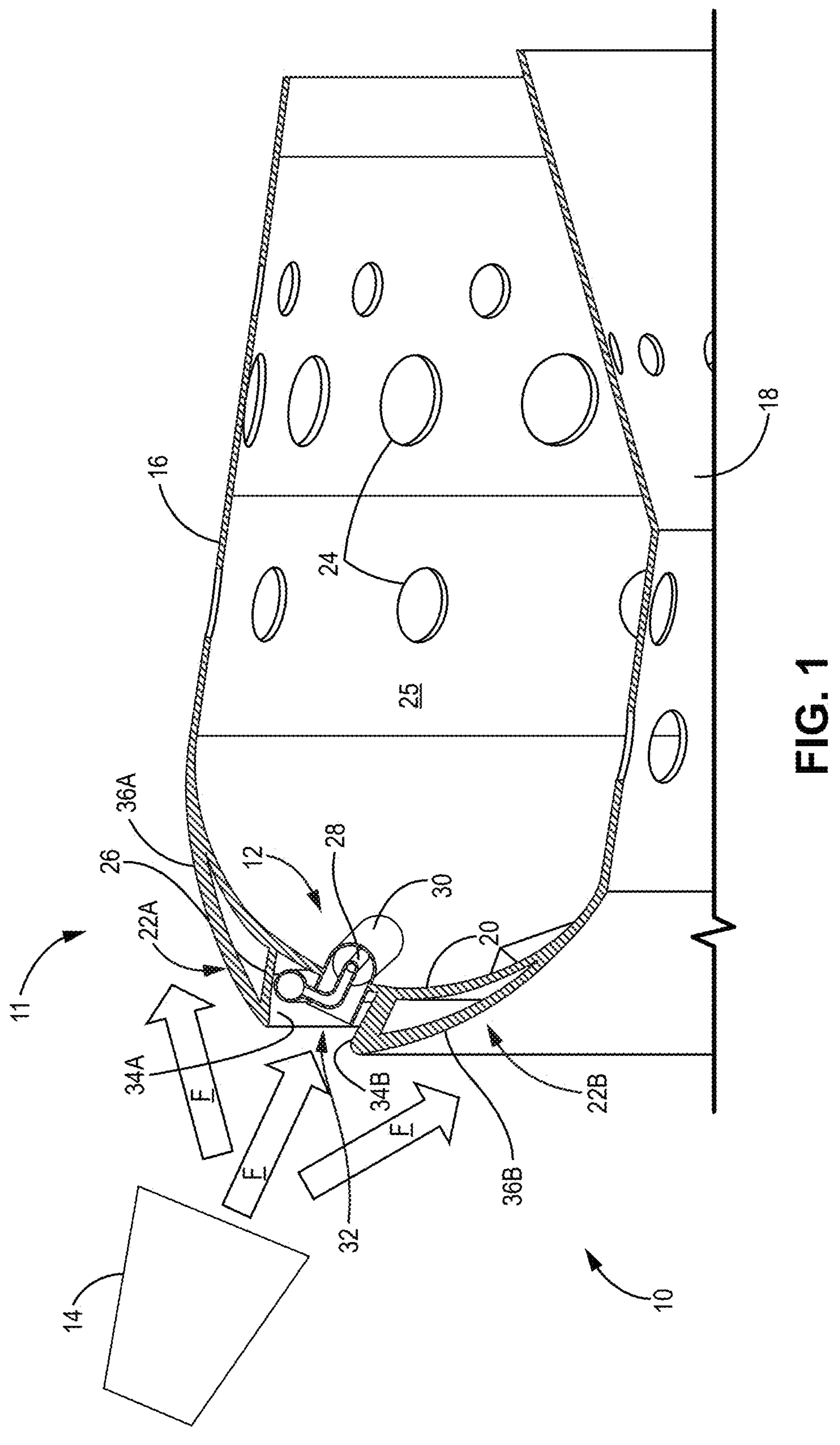
FIG. 1 is a schematized cross-sectional view of a combustor assembly and diffuser outlet of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Figure 2:
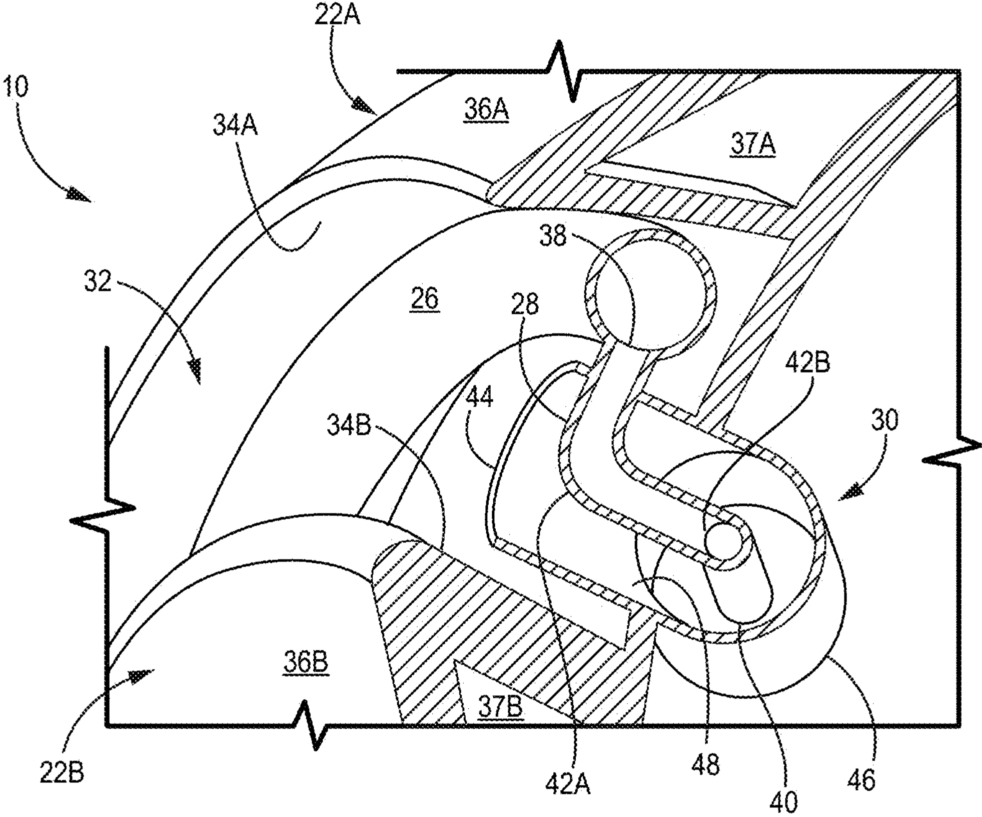
FIG. 2 is an enlarged partial cross-sectional view of a fuel system of the combustor assembly of FIG. 1.

FIG. 1 is a schematized cross-sectional view of a combustor assembly. FIG. 2 is an enlarged partial cross-sectional view a fuel system of the combustor assembly of FIG. 1.

Figure 3:
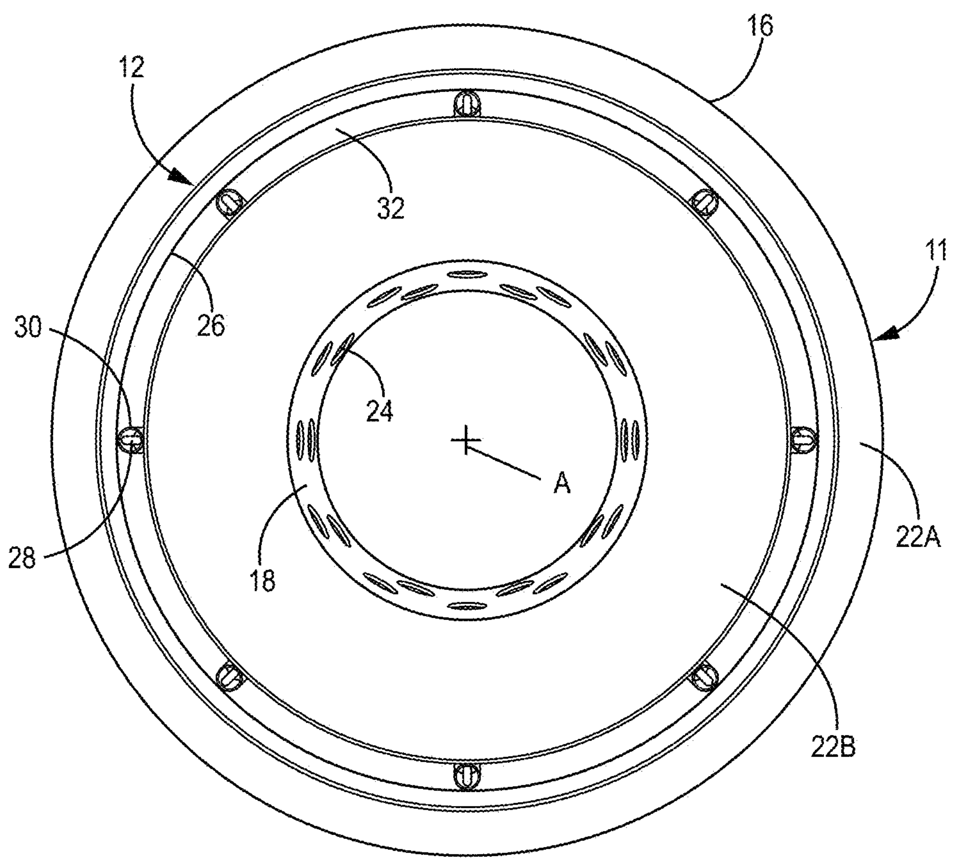
FIG. 3 is a perspective view of the combustor assembly of FIG. 1 taken from a forward end of the combustor assembly showing a fuel manifold and a plurality of air blast injector inlets.
Figures 4, 5:
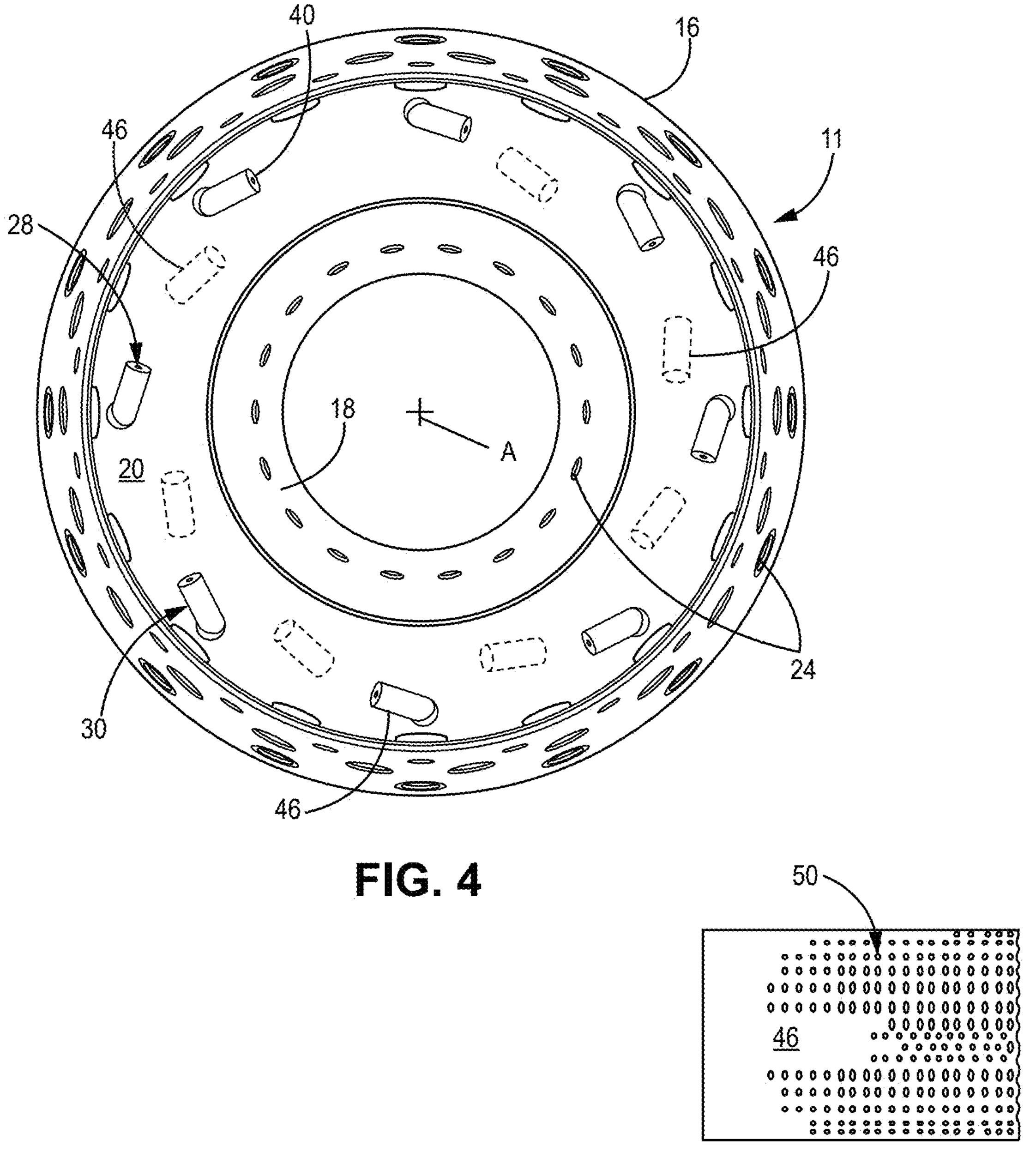
FIG. 4 is a perspective view of the combustor assembly of FIG. 1 taken from an aft end of the combustor assembly and showing a plurality of air blast and fuel injector outlets.
FIG. 5 is a side view of one embodiment of an air blast injector outlet of the combustor assembly of FIG. 4.

FIG. 3 is a perspective view of the combustor assembly taken from a forward end. FIG. 4 is a perspective view of the combustor assembly taken from an aft end. FIGS. 1-4 are discussed together. FIG. 1 shows combustor assembly 10 having integrally formed combustor 11 and fuel system 12, diffuser outlet 14, and compressed air flow F. Combustor 11 can include outer wall 16, inner wall 18, dome 20, flow guides 22A and 22B, a plurality of dilution holes 24, and combustion chamber 25. Fuel system 12 can include fuel manifold 26, fuel injector 28, and air blast injector 30. FIG. 2 shows enlarged cross-sectional views of fuel manifold 26, fuel injector 28, and air blast injector 30. FIG. 2 additionally shows flow guides 22A and 22B, channel 32, inlet walls 34A and 34B, guide walls 36A and 36B, cavities 37A and 37B, fuel injector inlet 38, fuel injector outlet 40, bends 42A and 42B, air blast injector inlet 44, air blast injector outlet 46, and bend 48 FIG. 3 shows combustor 11, fuel system 12, outer wall 16, inner wall 18, flow guides 22A and 22B, dilution holes 24, fuel manifold 26, fuel injectors 28, air blast injectors 30, channel 32, and axis A. FIG. 4 shows combustor 11, outer wall 16, inner wall 18, dome 20, dilution holes 24, fuel injectors 28, air blast injectors 30, fuel injector outlets 40, air blast injector outlets 46, and axis A.

Combustor 11 is an annular combustor configured for use in a gas turbine engine. Combustor 11 is configured to receive a compressed air flow F from diffuser outlet 14 of a compressor section of the gas turbine engine and to discharge combustion gases to a turbine section of the gas turbine engine, as known in the art. Combustor 11 is disposed about axis A (shown in FIGS. 2 and 3). In assembly in the gas turbine engine, axis A is an engine axis. Combustor 11 includes an annular outer wall 16 and an annular inner wall 18 disposed radially inward of outer wall 16. Outer wall 16 and inner wall 18 can be connected at a forward end by an annular dome 20. Dome 20 can curve concavely between outer wall 16 and inner wall 18, as shown in FIG. 1. Outer wall 16, inner wall 18, and dome 20 can be integrally formed as a unitary body via additive manufacturing. Outer wall 16, inner wall 18, and dome 20 define combustion chamber 25. Each of outer wall 16 and inner wall 18 can include a plurality of dilution holes 24 disposed circumferentially about axis A and configured to deliver compressed air flow F from diffuser outlet 14 to combustion chamber 25.

Combustor 11 can include annular flow guides 22A and 22B disposed forward of dome 20. Together flow guides 22A and 22B are configured to direct air flow F from diffuser outlet 14 toward outer surfaces of outer wall 16 and inner wall 18 and to provide air flow F to components of fuel system 12 disposed between flow guides 22A and 22B. Flow guide 22A can be shaped to direct air flow F toward outer wall 16. Flow guide 22B can be shaped to direct air flow toward inner wall 18. Flow guides 22A and 22B can be substantially similar. Flow guide 22A is spaced radially from flow guide 22B to define channel 32 therebetween for receiving air flow F from diffuser outlet 14. Flow guides 22A and 22B can be positioned on dome 20 to locate channel 32 in radial alignment with diffuser outlet 14. As described further herein, components of fuel system 12, including fuel manifold 26, portions of fuel injectors 28, and air blast injector inlets 44 can be disposed between flow guides 22A and 22B. Flow guides 22A and 22B can be integrally formed with dome 20, outer wall 16, and inner wall 18, via additive manufacturing, to define a unitary structure.

Annular flow guides 22A and 22B can have inlet walls 34A and 34B and guide walls 36A and 36B. Inlet walls 34A, 34B can extend axially forward from an outer surface of dome 20 toward diffuser outlet 14. Inlet wall 34A is spaced radially from inlet wall 34B to define channel 32 therebetween. Channel 32 is sized to partially house a portion of fuel system 12, including fuel manifold 26, and portions of fuel injectors 28, and air blast injector inlets 44. Channel 32 is separated from combustion chamber 25 by dome 20. Channel 32 is open to diffuser outlet 14 for receiving air flow F from diffuser outlet 14. Inlet walls 34A and 36B can be oriented to receive air flow F from diffuser outlet 14. In some embodiments, inlet walls 34A and 36B can be oriented to substantially align with air flow F from diffuser outlet 14, such that air flow F is directed to components of fuel system 12 in channel 32, as further described herein.

Guide walls 36A and 36B are solid walls that can define a forwardmost extent of combustor 11. Guide walls 36A and 36B can extend from a forwardmost extent of inlet walls 34A and 34B toward outer wall 16 and inner wall 18, respectively. Guide walls 36A and 36B can be convexly curved between inlet wall 34A and outer wall 16 and between inlet wall 34B and inner wall 16. A radius of curvature of guide walls 36A and 36B can be greater than a radius of curvature of dome 20. The shape of guide walls 36A and 36B can be defined to guide air flow F about outer wall 16 and inner wall 18, respectively. Guide walls 36A and 36B can be spaced from dome 20 to define cavities 37A and 37B therebetween. Cavities 37A and 37B can be fully enclosed by dome 20, inlet walls 34A, 34B, and guide walls 36A, 36B. Guide walls 36A and 36B can be spaced from dome 20 by a decreasing distance from inlet wall 34A toward outer wall 16 and from inlet wall 34B toward inner wall 18, such that cavities 37A and 37B are wider (in an axial direction) adjacent to inlet walls 34A and 34B. Cavities 37A and 37B can provide an insulating air plenum to reduce heat transfer from combustion chamber 25 to portions of fuel system 12 including, for example, fuel manifold 26.

Fuel system 12 can include fuel manifold 26, a plurality of fuel injectors 28, and a plurality of air blast injectors 30. Components of fuel system 12 can be integrally formed with combustor 11 via additive manufacturing to define a unitary structure. As illustrated in FIG. 3, fuel manifold 26 can be a substantially annular tube disposed about axis A in channel 32 between flow guides 22A and 22B. Fuel manifold 26 can have a circular cross-section as illustrated in FIG. 2 or other shape suitable for delivering fuel from a fuel source (not shown) to the plurality of fuel injectors 28. Fuel manifold 26 can be nested or recessed in channel 32 (i.e., disposed between the forwardmost extent of inlet walls 34A, 34B and dome 22. Channel 32 can have a radial extent sized to accommodate fuel manifold 26 and air blast injectors 30.

Fuel manifold 26 can be spaced apart from dome 20 and inlet walls 34A, 34B to reduce conductive heat pathways between combustion chamber 25 and fuel manifold 26 and to allow a cooling air flow F directed between flow guides 22A and 22B to envelop fuel manifold 26 to reduce coking in fuel manifold 26. A minimum gap size between fuel manifold 26 and each of dome 20 and inlet walls 34A and 34B can be about 0.02 inches (0.51 mm). A larger gap distance can be provided between fuel manifold 26 and dome 20 to reduce heat transfer from combustion chamber 25 to fuel manifold 26. Fuel manifold 26 can include an inlet (not shown) configured to receive fuel from a fuel source. The inlet can be provided, for example, on an accessible forward-facing wall of fuel manifold 26. In alternative embodiments, the inlet can be provided on a radially outer wall with a conduit extending from fuel manifold 26 through flow guide 22A to an outer case of the gas turbine engine.

Fuel manifold 26 can be disposed closer to one of inlet walls 34A and 34B to accommodate the plurality of air blast injectors 28 also disposed between inlet walls 34A and 34B. As illustrated in FIG. 2, fuel manifold 26 can be disposed closer to inlet wall 34A than to inlet wall 34B to accommodate air blast injectors 30 disposed radially inward of fuel manifold 26. In other embodiments, fuel manifold 26 can be disposed closer to inlet wall 34B than to inlet wall 34A to accommodate air blast injectors 30 disposed radially outward of fuel manifold 26. In yet other embodiments, fuel manifold 26 can be centrally located between inlet walls 34A and 34B and air blast injectors 30 can be shaped to extend around fuel manifold 26. In yet other embodiments, fuel manifold 26 can be centrally located between inlet walls 34A and 34B between adjacent air blast injectors 30 and can curve radially outward of or radially inward of air blast injectors 30. Fuel manifold 26 can be fully separated from dome 20 and inlet walls 34A and 34B.

A plurality of fuel injectors 28 are fluidly connected to fuel manifold 26 to deliver fuel from fuel manifold 26 to combustion chamber 25. The plurality of fuel injectors 28 are disposed circumferentially about axis A. Fuel injectors 28 can be spaced about axis A and fuel manifold 26, for example, at regular circumferential intervals. Fuel injectors 28 are tubular bodies configured to deliver fuel. Each fuel injector 28 includes fuel injector inlet 38 and fuel injector outlet 40. Fuel injector inlet 38 is fluidly connected to fuel manifold 26. Fuel injector outlet 40 is disposed in combustion chamber 25. Fuel injector 28 can bend in one or more directions between fuel injector inlet 38 and fuel injector outlet 40 to transfer fuel from fuel manifold 26 to combustion chamber 25. The shape of fuel injector 28 can be designed, within additive manufacturing design constraints, to promote effective fuel flow between fuel injector inlet 38 and fuel injector outlet 40.

Fuel injector inlet 38 can have a cross-sectional area substantially equal to a cross-sectional area of fuel injector outlet 40. Fuel injector inlet 38 and fuel injector outlet 40 can have the same cross-sectional shape. The cross-sectional area can remain substantially uniform between fuel injector inlet 38 and fuel injector outlet 40. As illustrated in FIG. 2, fuel injectors 28 can be defined by a plurality of cylindrical segments separated by bends 42A, 42B configured to direct fuel flow from fuel manifold 26 into combustion chamber 25. Bends 42A, 42B can be radiused to improve flow dynamics between fuel injector inlet 38 and fuel injector outlet 40.

A plurality of air blast injectors 30 are co-located with fuel injectors 28 and configured to inject air flow F received from diffuser outlet 14 into combustion chamber 25 with fuel from fuel injectors 28. Air blast injectors 30 are tubular bodies configured to deliver air flow F. Each air blast injector 30 includes air blast injector inlet 44 and air blast injector outlet 46. Air blast injector inlet 44 is disposed between inlet walls 34A and 34B. Air blast injector outlet 46 is disposed in combustion chamber 25 adjacent to dome 20 between outer wall 16 and inner wall 18. Air blast injector outlet 46 is disposed about fuel injector outlet 40 to deliver air flow F with fuel from fuel injector 28. Air flow F can atomize fuel entering combustion chamber 25.

Air blast injector inlet 44 can be recessed in channel 32 between flow guides 22A and 22B (i.e., disposed between the forwardmost extent of inlet walls 34A, 34B and dome 22. Air blast injector inlet 44 is spaced radially from fuel manifold 26 such that air flow F from diffuser outlet 14 into air blast injector inlet 44 is unobscured by fuel manifold 26. As illustrated in FIG. 2, air blast injector inlet 44 is disposed closer to inlet wall 34B than to inlet wall 34A. In other embodiments, air blast injector inlet 44 can be centrally located between inlet walls 34A and 34B or disposed closer to inlet wall 34A depending on the location of fuel manifold 26 as previously described.

Air blast injector inlets 44 can be aligned with air flow F from diffuser outlet 14 (i.e., oriented parallel to air flow F) to effectively receive air flow F. As illustrated in FIG. 3, air blast injector inlets 44 can be oriented substantially parallel to axis A. In other embodiments, air blast injector inlets 44 may be canted to align with diffuser outlet 14. Air blast injector outlets 46 are oriented to direct air flow F in combustion chamber 25.

Air blast injector outlets 46 are disposed adjacent to dome 20 between outer wall 16 and inner wall 18. Air blast injector outlets 46 can be spaced axially from dome 20. Air blast injector outlets 46 can be oriented to direct air flow F in a circumferential direction to provide tangential swirl in combustion chamber 25. As illustrated in FIG. 4, air blast outlets 46 can be angled between outer wall 16 and inner wall 18 with terminal ends disposed closer to inner wall 18 than to outer wall 16 to provide a desired flow in combustion chamber 25. All air blast injector outlets 46 can be oriented at the same angle relative in outer wall 16 and inner wall 18. Air blast injector outlets 46 can generally be centrally located between outer wall 16 and inner wall 18 as illustrated in FIG. 1. In some embodiments, all air blast injector outlets 46 can be disposed an equal distance from axis A (i.e., radially aligned about axis A). In alternative embodiments, air blast injector outlets 46 can be staggered radially about axis A as shown in phantom. For example, air blast injector outlets 46 can be provided in two circumferential rows disposed at different radial distances from axis A. In such embodiments, air injector inlets 44 can be staggered radially within channel 32. Fuel manifold 26 may bend around air injectors inlets 44 or may be centrally located between adjacent air blast injector inlets if space in channel 32 permits.

Air blast injectors 30 can bend in one or more directions between air blast injector inlet 44 and air blast injector outlet 46 to redirect a substantially axially directed air flow F received from diffuser outlet 14 to a substantially circumferentially directed air flow F in combustion chamber 25. The shape of air blast injectors 30 can be designed to provide effective fluid flow between air blast injector inlet 44 and air blast injector outlet 46 within additive manufacturing design constraints.

Air blast injector inlet 44 can have a cross-sectional area substantially equal to a cross-sectional area of air blast injector outlet 46. Air blast injector inlet 44 and air blast injector outlet 46 can have the same cross-sectional shape. The cross-sectional area can remain substantially uniform between air blast injector inlet 44 and air blast injector outlet 46. As shown in FIGS. 2-4, air blast injectors 30 can be defined by two cylindrical segments separated by bend 48 configured redirect axially directed air flow F received from diffuser outlet 14 to circumferentially directed air flow F in combustion chamber 25. Bend 48 can be radiused to improve flow dynamics between air blast injector inlet 44 and air blast injector outlet 46. Bend 48 can form an approximately 90-degree radiused elbow.

Air blast injectors 30 are integrally formed with and connected to dome 20 (e.g., in a region around bend 48). Air blast injectors 30 can support and connect fuel manifold 26 to dome 20 via fuel injectors 28.

Fuel injectors 28 are received in air blast injectors 30. As illustrated in FIG. 2, fuel injector inlet 38 can extend from fuel manifold 26 into air blast injector inlet 46 aft of an opening of air blast injector inlet 46. Fuel injector 38 is integrally formed with and connected to air blast injector 30. Fuel injector inlet 38 can extend from a radially inner wall of fuel manifold 26 as shown in FIG. 2 or from a radially outer wall of fuel manifold 26 depending on the positioning of fuel manifold 26 and air blast injector inlet 44. Fuel injector inlet 38 can be oriented approximately perpendicular to air blast injector inlet 44. Fuel injector 28 can turn at bend 42A in air blast injector inlet 44 to align with an axis of air blast inlet 46. Bend 42A can be disposed in a center of air blast inlet 44 such that fuel injector 28 extends coaxially with air blast injector inlet 44. Fuel injector 28 can again turn at bend 42B adjacent air blast injector outlet 46 to align fuel injector outlet 40 with an axis of air blast injector outlet 46. Bends 42A and 42B can be approximately 90-degree radiused elbows configured to centrally locate fuel injector 28 in air blast injector 30. The majority of fuel injector 28 is shrouded in air blast injector 30, which helps shield fuel injector 28 from hot combustion gases.

As illustrated in FIGS. 2 and 4, air blast injector outlets 46 and fuel injector outlets 40 can be disposed concentrically with air blast injector 30 surrounding fuel injector 28. Fuel injector outlet 40 and air blast injector outlet 46 can be sized to deliver an atomized fuel to combustion chamber 25. A ratio of an inner diameter of fuel injector outlet 40 to air blast injector outlet 46 can generally range from approximately 1:2 to 1:30. For example, air blast injector outlet 46 can have an inner diameter of approximately 0.3 inches (7.32 mm) and up to 0.75 inches (19.1 mm) and fuel injector outlet 40 can have an inner diameter ranging from 0.01 inches (0.25 mm) to 0.3 inches (7.62 mm). In some embodiments, fuel injector outlet 40 can preferably have an inner diameter of about 0.02 to 0.03 inches (0.51 to 0.76 mm). Discharge openings of fuel injector outlets 40 and air blast injector outlets 46 can be axially aligned (i.e., terminate at the same axial location).

In some embodiments walls of air blast injectors 30 can be configured to increase turbulence and thereby atomization of fuel from fuel injectors 28. For example, in some embodiments, air blast injectors 30 can have lattice 50 as illustrated in FIG. 5. Lattice 50 can be disposed on air blast injector outlet 46 adjacent to the discharge opening. Lattice 50 has a plurality of holes sized and spaced to increase air sheer and improve atomization of the fuel. In some embodiments, air blast injector outlet 46 can gradually transition to lattice 50, such that the number of openings in lattice 50 is greatest adjacent to the discharge opening of air blast injector outlet 46.

Combustor assembly 10, including combustor 11 and fuel system 12, can be integrally formed via powder bed fusion with laser or electron beam. A build direction can be along axis A in a forward to aft direction with respect to air flow F (i.e., beginning at flow guides 22A, 22B). Combustor assembly 10 can be formed of a single material suitable for operation at high temperatures including, for example, a nickel-based super alloy.

The disclosed combustor assembly includes integrally formed features configured to enhance combustor performance. The fuel manifold is nested in a forward channel of the combustor defined between flow guides on the combustor dome. The fuel manifold is disposed to receive a constant flow of high velocity diffuser outlet air, which envelopes the fuel manifold to limit coking thereof. The high velocity diffuser air is additionally fed to air blast injectors disposed in the channel and extending into the combustion chamber. Fuel injectors are shrouded in the air blast injectors, which help shield the fuel injectors from hot combustion gases and atomize fuel for delivery into the combustion chamber.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A combustor assembly for a gas turbine engine includes an annular combustor disposed about an axis and a fuel system. The combustor includes an inner wall, an outer wall, and a dome connecting the inner wall and outer wall to define an annular combustion chamber. The fuel system includes a fuel manifold disposed forward of the dome, a plurality of air blast injectors connected to the dome and circumferentially arranged about the axis, and a plurality of fuel injectors fluidly connected to the fuel manifold. Each of the plurality of air blast injectors includes an inlet disposed adjacent to the fuel manifold and an outlet disposed in the combustion chamber. Each of the plurality of fuel injectors is shrouded in an air blast injector of the plurality of air blast injectors.

The combustor assembly of the preceding paragraph can optionally include, additionally and/or alternatively, any one or more of the following features, configurations, and/or additional components:

In an embodiment of the preceding combustor assembly, the combustor can further include a first flow guide and a second flow guide disposed on the dome that are shaped to guide an air flow toward the inner and outer walls of the combustor.

In an embodiment of any of the preceding combustor assemblies, the first flow guide and the second flow guide can extend axially forward of the dome.

In an embodiment of any of the preceding combustor assemblies, each of the first flow guide and the second flow guide can include an inlet wall extending axially forward from the dome and a curved guide wall extending from the inlet wall toward the respective inner wall or outer wall.

In an embodiment of any of the preceding combustor assemblies, the first flow guide and the dome can define a first enclosed cavity therebetween, and the second flow guide and the dome can define a second enclosed cavity therebetween.

In an embodiment of any of the preceding combustor assemblies, the first flow guide can be spaced radially from the second flow guide to define a channel therebetween and the fuel manifold and the inlets of the plurality of air blast injectors can be disposed in the channel.

In an embodiment of any of the preceding combustor assemblies, the fuel manifold can be recessed in the channel.

In an embodiment of any of the preceding combustor assemblies, the fuel manifold can be spaced apart from the dome and each of the first flow guide and second flow guide.

In an embodiment of any of the preceding combustor assemblies, the fuel manifold can be disposed closer to one of the first flow guide and the second flow guide and the plurality of air blast injectors can be disposed closer to the other of the first flow guide and the second flow guide.

In an embodiment of any of the preceding combustor assemblies, the fuel manifold can be annular.

In an embodiment of any of the preceding combustor assemblies, each of the plurality of fuel injectors can include a first bend and a second bend. The first bend can centrally locate the fuel injector in the inlet of the air blast injector. The second bend can centrally locate the fuel injector in an outlet of the air bast injector.

In an embodiment of any of the preceding combustor assemblies, a discharge opening of the fuel injector can be axially aligned with a discharge opening of the outlet of the air blast injector.

In an embodiment of any of the preceding combustor assemblies, the fuel injector can extend through and can be integrally connected to a wall of the inlet of the air blast injector.

In an embodiment of any of the preceding combustor assemblies, the air blast injectors can be integrally connected to the dome and wherein the fuel manifold can be connected to and supported by the air blast injectors via the connection between the fuel injector and the air blast injector.

In an embodiment of any of the preceding combustor assemblies, the inlets of the plurality of air blast injectors can be oriented to align with a diffuser outlet of the gas turbine engine to receive a diffuser outlet air flow.

In an embodiment of any of the preceding combustor assemblies, outlets of the plurality of air blast injectors can extend along the dome and are disposed at an angle relative to the inner wall and the outer wall.

In an embodiment of any of the preceding combustor assemblies, the fuel manifold can be disposed radially outward and/or radially inward of the inlets of the plurality of air blast injectors.

In an embodiment of any of the preceding combustor assemblies, the first flow guide and second flow guide can be disposed on the dome to position the channel in radial alignment with a diffuser outlet of the gas turbine engine.

The invention claimed is:

1. A combustor assembly for a gas turbine engine, the combustor assembly comprising:

an annular combustor disposed about an axis, the annular combustor comprising:

an inner wall;

an outer wall;

a dome connecting the inner wall and the outer wall to define an annular combustion chamber;

a first flow guide disposed on the dome, the first flow guide comprising:

a first inlet wall extending axially forward from the dome; and a first curved guide wall connected to a forward end of the first inlet wall and extending from the first inlet wall toward the outer wall of the annular combustor; and a second flow guide disposed on the dome and radially separated from the first flow guide, the second flow guide comprising:

a second inlet wall extending axially forward from the dome; and a second curved guide wall connected to a forward end of the second inlet wall and extending from the second inlet wall toward the inner wall of the annular combustor;

wherein, together, the first inlet wall, the second inlet wall, and the dome define an annular channel having an annular opening disposed opposite the dome to receive an airflow from a diffuser outlet;

a fuel system comprising:

a fuel manifold disposed in the annular channel between the first inlet wall and the second inlet wall forward of the dome;

a plurality of air blast injectors connected to the dome and circumferentially arranged about the axis, each of the plurality of air blast injectors comprising an inlet disposed adjacent to the fuel manifold in the annular channel to receive the air flow from the diffuser outlet and an outlet disposed in the combustion chamber; and a plurality of fuel injectors fluidly connected to the fuel manifold, each of the plurality of fuel injectors shrouded in a respective air blast injector of the plurality of air blast injectors.

2. The combustor assembly of claim 1, wherein the first flow guide and the dome define a first fully enclosed cavity therebetween, and wherein the second flow guide and the dome define a second fully enclosed cavity therebetween.

3. The combustor assembly of claim 1, wherein the fuel manifold is recessed in the annular channel.

4. The combustor assembly of claim 1, wherein the fuel manifold is spaced apart from the dome and each of the first flow guide and second flow guide.

5. The combustor assembly of claim 1, wherein the fuel manifold is disposed closer to one of the first inlet wall and the second inlet wall and wherein the plurality of air blast injectors is disposed closer to the other of the first inlet wall and the second inlet wall.

6. The combustor assembly of claim 1, wherein the fuel manifold is annular.

7. The combustor assembly of claim 1, wherein each of the plurality of fuel injectors comprises a first bend and a second bend.

8. The combustor assembly of claim 7, wherein the first bend centrally locates the respective fuel injector in the inlet of the respective air blast injector.

9. The combustor assembly of claim 7, wherein the second bend centrally locates the respective fuel injector in an outlet of the respective air bast injector.

10. The combustor assembly of claim 1, wherein a discharge opening of each fuel injector is axially aligned with a discharge opening of the outlet of the respective air blast injector.

11. The combustor assembly of claim 1, wherein each fuel injector extends through and is integrally connected to a wall of the inlet of the respective air blast injector.

12. The combustor assembly of claim 11, wherein air blast injectors of the plurality of air blast injectors are integrally connected to the dome and wherein the fuel manifold is connected to and supported by the air blast injectors via the respective connections between the fuel injectors and the air blast injectors.

13. The combustor assembly of claim 1, wherein the inlets of the plurality of air blast injectors are oriented to align with a diffuser outlet of the gas turbine engine to receive a diffuser outlet air flow.

14. The combustor assembly of claim 13, wherein outlets of the plurality of air blast injectors extend along the dome and are disposed at an angle relative to the inner wall and the outer wall.

15. The combustor assembly of claim 1, wherein the fuel manifold is disposed radially outward and/or radially inward of the inlets of the plurality of air blast injectors.

16. The combustor assembly of claim 1, wherein the first flow guide and the second flow guide are disposed on the dome to position the annular channel in radial alignment with the diffuser outlet of the gas turbine engine.

17. The combustor assembly of claim 1, wherein each air blast injector comprises a cylindrical wall defining the outlet, wherein the cylindrical wall comprises a plurality of holes sized and spaced to increase an air sheer and improve atomization of the fuel.

18. The combustor assembly of claim 17, wherein the plurality of holes increase in number toward the outlet.

* * * * *